United States Patent
Spooner

(10) Patent No.: US 12,260,314 B2
(45) Date of Patent: *Mar. 25, 2025

(54) MACHINE-BASED PREDICTION OF VISITATION CAUSED BY VIEWING

(71) Applicant: BILLUPS, INC., Lake Oswego, OR (US)

(72) Inventor: Shawn Spooner, Beaverton, OR (US)

(73) Assignee: Billups LLC, Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,093

(22) Filed: May 22, 2023

(65) Prior Publication Data

US 2023/0297813 A1 Sep. 21, 2023

Related U.S. Application Data

(63) Continuation of application No. 16/170,955, filed on Oct. 25, 2018, now Pat. No. 11,694,063.

(51) Int. Cl.
*G06N 3/045* (2023.01)
*G06F 16/901* (2019.01)
*G06F 16/907* (2019.01)
*G06F 17/18* (2006.01)
*H04W 4/02* (2018.01)

(52) U.S. Cl.
CPC ......... *G06N 3/045* (2023.01); *G06F 16/9024* (2019.01); *G06F 16/907* (2019.01); *G06F 17/18* (2013.01); *H04W 4/023* (2013.01)

(58) Field of Classification Search
CPC ....... G06N 3/045; G06F 17/18; G06F 16/907; G06F 16/9024; H04W 4/023; H04W 4/024; H04W 4/029

See application file for complete search history.

(56) References Cited

U.S. PATENT DOCUMENTS

| | | | |
|---|---|---|---|
| 8,606,630 B2 | 12/2013 | Fordyce, III et al. | |
| 8,793,066 B2 | 7/2014 | Panabaker et al. | |
| 8,799,461 B2 | 8/2014 | Herz et al. | |
| 9,165,304 B2 | 10/2015 | Weiss et al. | |
| 10,204,499 B1 * | 2/2019 | Newstadt | G08B 21/0269 |
| 10,832,290 B1 | 11/2020 | Chennavasin et al. | |
| 11,276,012 B2 * | 3/2022 | Dong | G06N 20/00 |

(Continued)

FOREIGN PATENT DOCUMENTS

WO 2017212472 A1 12/2017

OTHER PUBLICATIONS

Banerjee, Sujoy, and Michael Greene. "Assessing Brand Visibility Using Machine Learning." (2016).

(Continued)

*Primary Examiner* — Jungwon Chang
(74) *Attorney, Agent, or Firm* — Lempia Summerfield Katz LLC

(57) ABSTRACT

For machine-based prediction of visitation, a machine-learned network embeds the visitation and metadata information. Since the trace data used to show access may be sparse, another machine-learned network completes the route data. Another machine-learned network recommends effectiveness of content based on routes, the graph, metadata, and/or other information. The recommendation is based on training using counterfactual and/or other causal modeling.

20 Claims, 5 Drawing Sheets

(56) References Cited

U.S. PATENT DOCUMENTS

| | | | |
|---|---|---|---|
| 11,694,063 B2* | 7/2023 | Spooner | G06F 17/18 706/21 |
| 2003/0225668 A1 | 12/2003 | Goto et al. | |
| 2009/0106082 A1 | 4/2009 | Senti et al. | |
| 2011/0099046 A1* | 4/2011 | Weiss | G06Q 30/0202 705/7.31 |
| 2012/0116892 A1 | 5/2012 | Opdycke | |
| 2014/0136104 A1* | 5/2014 | Spears | G01C 21/3484 705/14.66 |
| 2015/0168161 A1* | 6/2015 | Raychev | G01C 21/3859 701/430 |
| 2016/0241993 A1 | 8/2016 | Bellens et al. | |
| 2017/0034593 A1 | 2/2017 | Ray et al. | |
| 2017/0286845 A1 | 10/2017 | Gifford et al. | |
| 2017/0308908 A1 | 10/2017 | Weiss et al. | |
| 2018/0005194 A1 | 1/2018 | Dotan-Cohen et al. | |
| 2018/0047091 A1* | 2/2018 | Ogden | G06Q 30/0261 |
| 2019/0005412 A1* | 1/2019 | Matus | G07C 5/085 |
| 2019/0147366 A1 | 5/2019 | Sankaran et al. | |
| 2020/0053511 A1* | 2/2020 | Yamazaki | H04W 4/029 |
| 2020/0213805 A1* | 7/2020 | Liang | G06N 20/00 |
| 2021/0160653 A1* | 5/2021 | Omidvar Tehrani | H04W 4/024 |

OTHER PUBLICATIONS

Bottou, Léon, et al. "Counterfactual reasoning and learning systems: The example of computational advertising." The Journal of Machine Learning Research 14.1 (2013): 3207-3260.

Stegmann, Roelant A., et al. "A survey of evaluation methods for personal route and destination prediction from mobility traces." Wiley Interdisciplinary Reviews: Data Mining and Knowledge Discovery 8.2 (2018): e1237.

* cited by examiner ent is difficult, let alone predicting differences in placement of the content on visitation. There are many factors that make up a person's decision to visit, and there is little data available about an individual's decision. Predicting access to content is difficult. Humans may rely on educated guesses or measured results from past presentations of content, but the accuracy and ability to appreciate subtilties in large populations is lacking.

MACHINE-BASED PREDICTION OF VISITATION CAUSED BY VIEWING

PRIORITY

This applications claims priority to and is a continuation of U.S. patent application Ser. No. 16/170,955, filed Oct. 25, 2018, and titled MACHINE-BASED PREDICTION OF VISITATION CAUSED BY VIEWING, which is incorporated herein in its entirety.

BACKGROUND

The present embodiments relate to determining visitation of a location based on viewing content. A person may be influenced to visit by access to content. Different people react to content in different ways. Predicting the effect of content is difficult, let alone predicting differences in placement of the content on visitation. There are many factors that make up a person's decision to visit, and there is little data available about an individual's decision. Predicting access to content is difficult. Humans may rely on educated guesses or measured results from past presentations of content, but the accuracy and ability to appreciate subtilties in large populations is lacking.

SUMMARY

By way of introduction, the preferred embodiments described below include methods, computer readable media, and systems for machine-based prediction of visitation. A machine-learned network embeds the visitation and metadata information. Since the trace data used to show access may be sparse, another machine-learned network completes the route based on routes used by similar devices. Another machine-learned network recommends effectiveness of content based on routes, the graph, metadata, and/or other information. The recommendation is based on training using counterfactual and/or other causal modeling.

In a first aspect, a method is provided for machine-based prediction of visitation. First trace data showing routes of devices over time in a region is obtained. The first trace data including unobserved portions for at least some of the devices. A first machine-learned network trained using deep learning generates second trace data for the unobserved portions for the at least some of the devices. A second machine-learned network models a causal effect of first content to visits of a location from the first graph. A prediction of effectiveness of second content based on the causal effect is displayed.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Given past behavioral data, an artificial intelligence model predicts future movement patterns. The system decides when and where a user is likely to go in a future time horizon, discerning which vehicle for presenting content is best suited to reaching the desired audience. Mobile content may be targeted to users who have a high probability of converting to paying customers over the course of a campaign. Daily, weekly, and/or monthly travel patterns may be predicted as behavior to improve prediction of visitation based on content. Such prediction may be used in city planning, route planning and scaling, staffing and hours of operation optimization, ad-serving via out of home, or mobile targeting.

Application using a machine-learned network as the artificial intelligence increases speed of determination and may provide more accurate information in a broader range of situations, even where the situation is not used in training. The relationships of various metadata factors to cause of content to visit may be found using one or more machine-learned networks in a way different than a human would find. Using machine-learned networks for determining similarity of behavior, completing routes, and making recommendations based on graphing results in accurate estimation of effectiveness or parameters for content.

Figure 1:
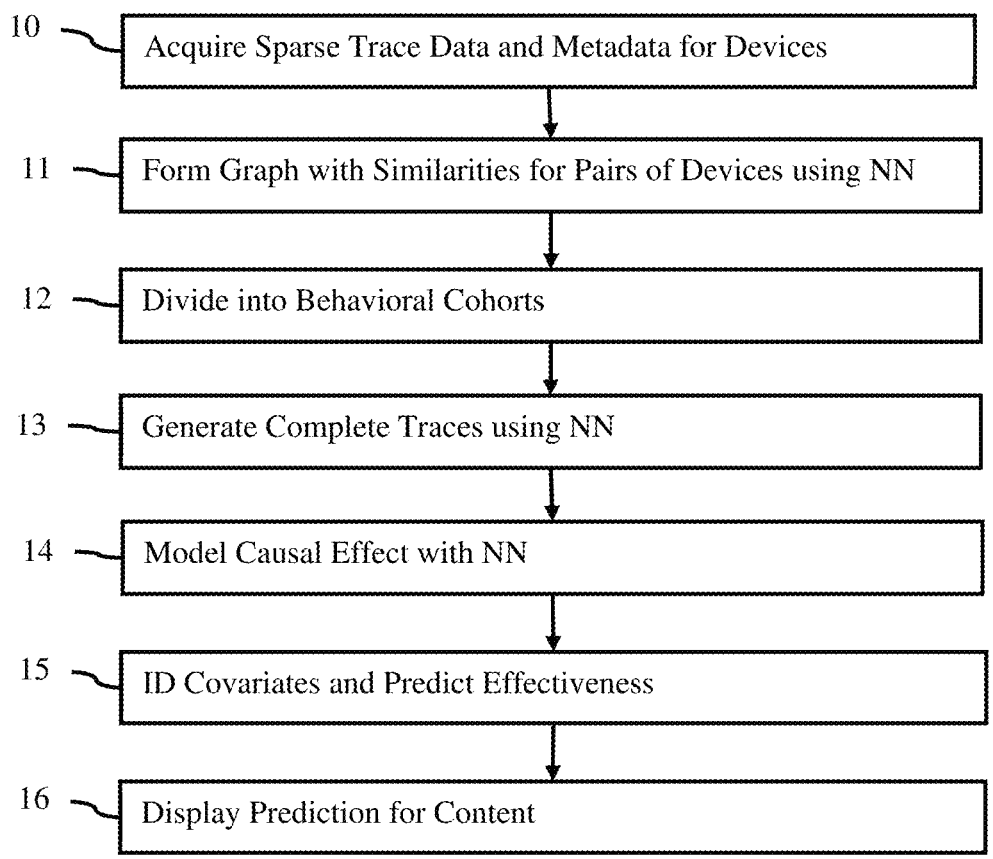
FIG. 1 is a flow chart diagram of one embodiment of a method for machine-based prediction of visitation.

FIG. 1 shows one embodiment of a method for machine-based prediction of visitation. Past behavior reflected in mobile device trace data for exposure to content and visitation of locations linked to the content is used to predict effectiveness of subsequent content to visitation to the location or other locations. Machine-learned networks are used to create a graph showing similarity in behavior related to devices, complete sparse trace data to determine full routes, and to recommend content placement (e.g., a time and/or locations) for delivering content to potential visitors.

The method of FIG. 1 is implemented in the order shown (e.g., top to bottom or numerical) or a different order. For example, act 15 is performed as part of performing act 14.

Additional, different, or fewer acts may be performed. For example, act 16 is omitted. As another example, acts 12 and/or 13 are omitted. In yet another example, act 15 is omitted. Acts for selecting a geographic region, a demographic or behavior group, a period, or other configuration of the recommendation for content may be provided.

Figure 8:
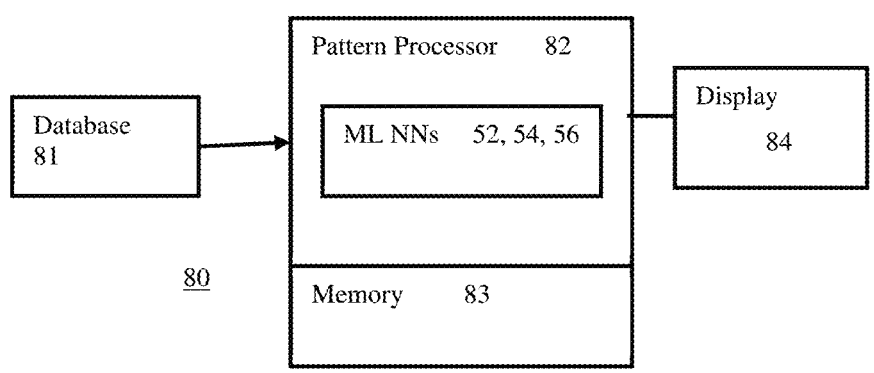
FIG. 8 is a block diagram of one embodiment of a system for recommending time and location of content.

The method is implemented by the system of FIG. 8. In one embodiment, the method is implemented by an artificial intelligence processor, including machine-learned network or networks, a memory, and/or a display. A server, computer, or other processor may be used. In one embodiment, parallel processing is used with one or more graphics processing units. Multiple devices may be used, such as one processor to create a database of a graph and routes and another processor to recommend based on the graph and/or routes in the database.

In act 10, a processor or database acquires trace data. The trace data is acquired by loading or receiving from a database or other source.

The trace data indicates the travel paths that are used by mobile devices. The mobile devices are cellular telephones, whether in a vehicle, on a bike, or carried by a pedestrian. SafeGraph or other sources provide publisher level device level trace (GPS) data on 10-15% of the total US population every day. This trace data records the longitude, latitude, timestamp, and a unique identifier called the advertising ID per second, minute, or other temporal resolution.

The trace data may be sparse, such as indicating locations for a given mobile device with one or more gaps of any time and/or distance. For one or more devices (e.g., for all or at least some), there are unobserved portions. The unobserved portions are for times and/or locations.

Figure 2:
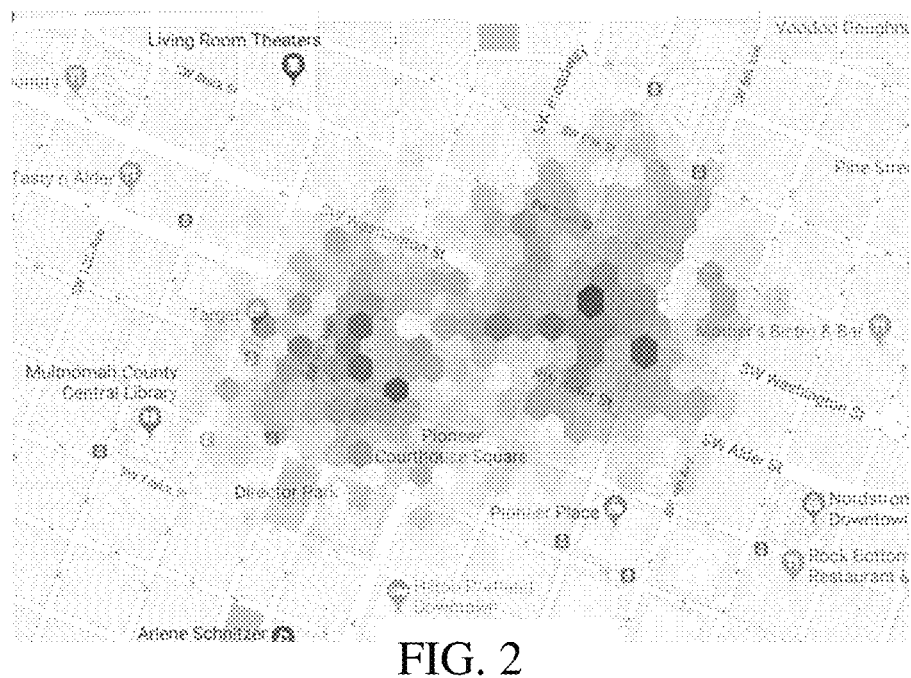
FIG. 2 is an example mapping of trace data by time and location.

The trace data may be formatted as a route. In one embodiment, the trace data is formatted as or reformatted to be a spatial-temporal representation. Location in 4-meter zones by 5-minute blocks of time are used. Other area and/or temporal resolutions may be used. The surface of the region of interest is divided into discrete cells with a frequency or number of times at that cell representing the number of time increments the device is located at the cell (e.g., stacking time onto of each cell). FIG. 2 shows an example where each hex is shaded by the number of times at which the device is at that location.

The trace data for each device also includes metadata, such as owner, place of employment, age, income level, type of car, type of house, purchase amount, purchase location, what purchased, and/or other information. Demographic, psychographic, attitudinal, or other membership information is provided.

Mapping information may also be included. For example, the locations of businesses or other points of interest, the locations of content presentation (e.g., billboards, sign boards, walls, or posters), or other location information is acquired. A business location is labeled by a unique location identifier for each location of the business.

Figure 3:
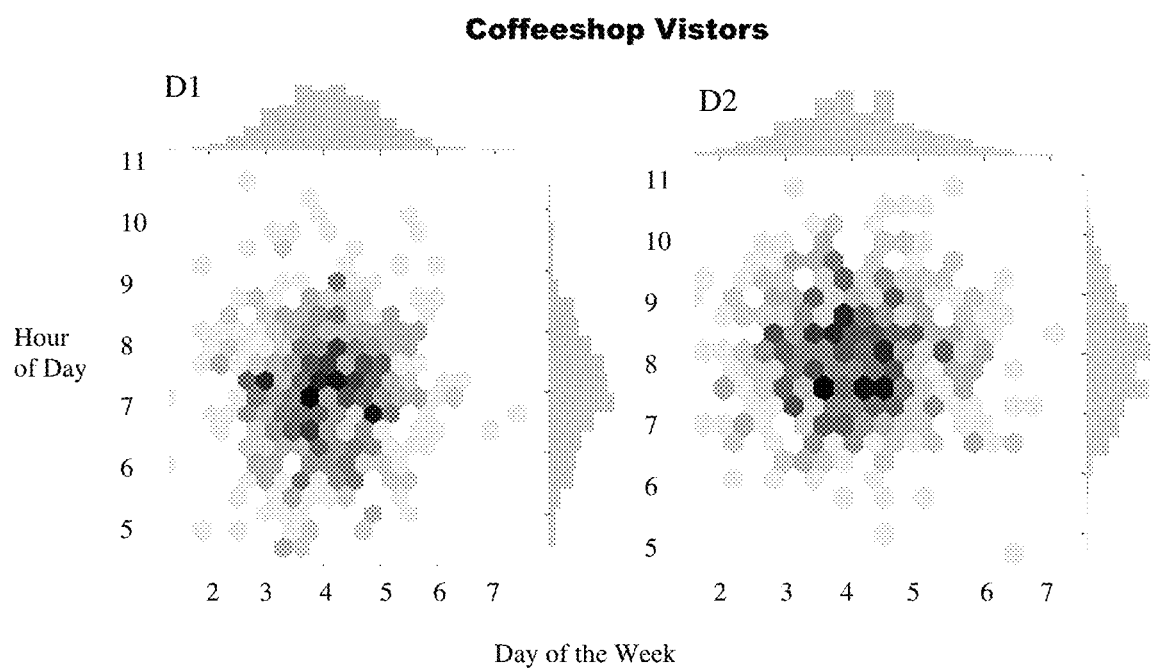
FIG. 3 is an example mapping of trace data to a specific location for two different devices.

The trace data may be linked to the business location or locations, such as a count of visits by time. FIG. 3 shows distributions by day of week and hour of the day for two devices visiting a coffeeshop A. Each distribution represents the days and times of days that the device was at the location or locations of a business. The shading is a count of times. Device D1 tends to behave in a way that results in visits at earlier times of day and a narrower day of the week range (e.g., less likely to visit the location on a weekend and after 9 am) than device D2.

The trace data and corresponding metadata may be acquired for any number of devices. For example, raw mobile data is acquired daily for about 50 million or other number of devices. This trace data is sparse (i.e., missing time and/or location information), resulting in unobserved states for each user.

Figure 5:
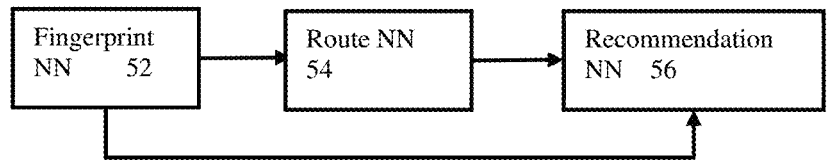
FIG. 5 is a block diagram showing a sequence of three machine-learned networks.

The trace data and corresponding metadata may be checked or cleaned, such as by a cluster of graphics processing unit (GPU) servers (e.g., NVidia cards). Field programmable gate arrays may be used. Once the data is processed and cleaned, the data is fed into a pipeline of three models formed by three machine-learned networks. FIG. 5 shows the pipeline of the Fingerprint neural network 52, then a Route neural network 54, and a Recommendation (e.g., prediction of location and period) neural network 56. Other types of machine-learned networks may be used. Additional, different, or fewer models may be used.

In act 11, an artificial intelligence or other processor forms a graph based on visits to locations. The graph pairs devices and provides a similarity between the devices based on embedded location and activity behavior of the devices. The various pairs and edges for multiple devices forms the graph.

Figure 4:
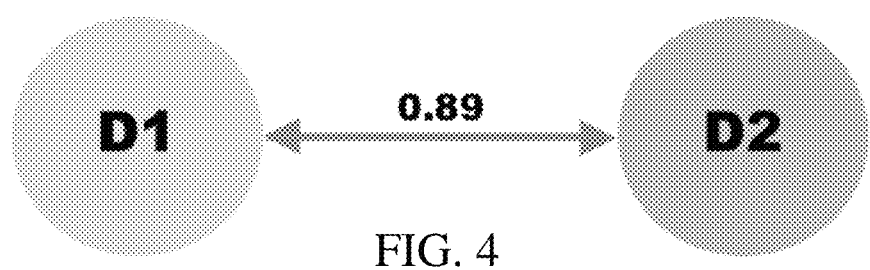
FIG. 4 shows part of a graph connecting two devices by an edge with an edge weight based on similarity.

FIG. 4 shows an example part of the graph, a linking between two devices D1 and D2. Based on the visitation data for a location (e.g., see FIG. 3), types of activity or behavior from metadata or the trace data linked to location (e.g., health club visit), and/or other metadata, the processor generates the level of similarity or distance between the devices D1, D2. The graph includes links between all pairs or pairs of devices having a similarity or distance above or below a threshold amount.

In one embodiment, each device D1, D2 is augmented with a continuous feature matrix V encoding times of visits, divided into 5-minute buckets of time (see FIG. 3). A visitation graph (see FIG. 4) is formed by linking users who co-visit points of interest at similar times and in similar frequencies. The graph uses pairs that co-visit the location of interest (e.g., coffeeshop A). A threshold is applied to the similarity to include graph edges (e.g., linked pairs of devices) for similar device behavior and not for less similar device behavior. Each node represents a device (or corresponding person), and each edge represents how similar the subject's visitation patterns are in terms of both frequency and time to the location. The edges are undirected as the relationship to a point of interest is assumed symmetric between devices when the devices share the same time window and point of interest. The weight of the edge is determined by how similar the frequency and time of day patterns are between each pair of devices.

The similarity and/or the graph is generated by a machine-learned network. The machine-learned network is trained to output similarity and/or graph based on input of the trace data, metadata, location visitation maps, device routes, and/or other information. In one embodiment, the machine-learned network is trained to output one or more graphs, similarity, and/or embedding of behavior information based on input of maps for location visit behavior and/or activity behavior. In another embodiment, the machine-learned network outputs the graph, and then the graph is utilized to create lower dimensional dense vector embeddings using graph2vec that captures the structure of the graph, specifically the neighborhood region surrounding each device.

Any machine learning may be used. For example, a machine-learned neural network, such as a graph convolutional network, is used. As another example, a generative machine-learned network, such a generative adversarial neural network is used. Maps are input, and a graph or similarity is output based on deep learned convolutions and other operations.

For training the network, a computer, workstation, server, or other processor accesses a database of hundreds or thousands of examples with known graphs and/or other output. The machine trains the network from the examples and ground truth outputs of the database. Using a piecewise-differentiable function or other deep learning function, the machine trains the deep neural network to output.

Once trained, the neural network parameters (e.g., machine trained features, kernels, connections, weights, or layer values) are used to output given an unseen input, such as additional maps generated from additional trace data for a different campaign. The training uses data from one or more campaigns for a given business or for different businesses. The trained network may be used for later or different campaigns for the same or different business. For application of the learned network, the network receives the input (e.g., visitation and/or activity maps) and generates the output—the graph or similarity.

In one embodiment, the model is formulated as a deep neural network that phrases the problem in terms of graph embeddings. Embeddings for location and/or activity maps to a lower dimensional space are learned. The graph embeddings of similarity in frequency and/or location between visit maps, spatial-temporal map, other mappings, in metadata related to behavior, and/or other information are formed. These embeddings are learned to be used to output a similarity based on a lower dimensional vector from the frequency, location, and/or metadata.

The role of the model and corresponding machine-learned neural network is to rank the similarity between every pair of users or devices inside of the market. Any market definition may be used, such as franchise region, geographical region, political region (e.g., city, county, state, country), or other area. For example, the market is defined as the census CBSA boundary. The home location of every device in a single CBSA identifies the devices and corresponding data to be used to generate the graph.

The input is behavior information reflected in the trace data and/or metadata. In one embodiment, the behavior is represented in two separate bipartite graphs or maps: users mapped to locations, such as the maps of FIG. 3. The mapping may include metadata for the device or corresponding user, such as metadata on the visit, time of day, dwell, purpose, or visit history for a location (e.g., coffeeshop A) and/or metadata on demographics or other information. Another of the bipartite graphs or maps is activity type, such as activities showing behaviors (e.g., this user goes to trails to run). Maps are generated for each of the devices used in training. Users who embed close in either of these two spaces are likely to have similar demographics and expressed behaviors.

For the ground truth similarity, a distance between each pair of users is used. To determine the ground truth, the similarity is computed using Jaccard distance or other set wise distance for categorical data variables (i.e., discrete variables) and Mahalanobis distance for continuous data (e.g., how often visited, education, age, or other information). Other measures of similarity in the mappings and/or metadata may be used, such as a Cosine similarity. Where multiple measures are used for a given pair of devices, an average or other combination may be used to determine the level of similarity.

This entire model is trained once or periodically, such as weekly. Any machine may be used, such as training on a distributed GPU cluster using shared gradient descent updates on each step. Inference is done on a single server using local GPUs. Other machines may be used.

The output of the machine-learned network is the similarity, such as the 0.89 for the edge shown in FIG. 4 or a graph with the similarities for various pairs. The similarity may be normalized as output or normalized after output. Other information may be output or provided by the network, such as embeddings for location and/or activity. A more complete estimate of activity and/or location maps may be output.

The machine-learned network provides or outputs the entire graph. Alternatively, the machine-learned network provides or outputs a similarity between a pair of devices, and the graph is formed by repetitively using the network to output similarities for the edges of the graph related to different pairs.

In act 12, the artificial intelligence processor or other processor divides the devices into behavior cohorts. The division is based on the graph of paired devices, such as based on the similarities for the graph edges. Given the full graph of user-to-user pairs (e.g., device-to-device), a segmentation model places each device into a single behavioral audience based on the similarities in location of home, visit behaviors of the user, and/or demographics. The similarity for the graph provides the similarities. Alternatively, separate similarity calculations are performed. The embeddings of the behavior information may be used to determine similarity.

Clustering of the graph may be used, such as a Bayesian hierarchal clustering to maximize separation of the behavior cohorts. Each cohort is defined around the core set of behaviors that exemplify this group, such as using the location and/or activity maps to cluster. Any cohort separation may be used. Over time, users or devices may migrate between cohorts as their behaviors evolve, and new cohorts may come into existence based on changing seasonal behaviors or new locations being introduced into the data set. A behavioral cohort may be a highly accurate predictor of future behavior of a user, far more so than the grouping by demographics alone.

In act 13, the artificial intelligence processor or other processor completes the route and/or fills in visitation maps. Additional trace data for the sparse traces is generated. For each mobile device, the route or routes traveled by that device (e.g., over a period with trace data showing different locations) is determined. The unobserved portions of the route are estimated. The partially observed (e.g., sparse) trace data is connected. The route or routes are reconstructed from the partially observed traces. One or more routes are reconstructed for each mobile device. Routes are reconstructed for the various mobile devices. The output is trace data for one or more of the unobserved portions. The output may be trace data for the unobserved portions or the trace data for the unobserved portions and trace data for the observed portions combined. The trace data for the observed portions may be the same or different than (e.g., refined) the input sparse trace data for the observed portions.

A machine-learned network is used to complete the route. Sparse trace data is input, and the network outputs more complete trace data. Other information may be input, such as membership in a behavior cohort, characteristics of the behavior cohort, routes or visitation maps for other devices in a same behavior cohort, and/or metadata for other devices in the cohort.

Any machine learning may be used. For example, a deep Markov model is used. Deep learning with a neural network is used. The ground truth may be complete traces for members of a same behavior cohort in a same region. The machine learns to relate an input sparse trace to an output more complete trace. For training in one embodiment, the partially observed visitation data (e.g., the model is shown a small portion of the visits data for the device and the full portion is used as the ground truth) and the trace data per device is used to learn to complete the missing visits. The accuracy is validated on visits not seen in the training data. The model learns to connect all the dots in a route and/or to complete the visitation map. The output trace is based on patterns from devices of the behavior cohort to which the device being routed is a member.

In one embodiment, the unobserved portion of each user's daily trips are estimated from their past patterns and the patterns of similar users. The similar patterns are drawn from the output of machine-learned network used to graph similarities. Partial trajectories that are contextually relevant for the user and location looking to complete are identified by the level of similarity. The output is the full day's journey for every user describing which businesses were visited, when and how long the device stayed at each business as well as the routes and modes (e.g., car, bus, train, walking . . . ) used to travel to the businesses. Ground truth routes are accurately recaptured even in dense highly noisy metro downtown areas like Manhattan, where the GPS trace data can be of a very high drift. A device may be localized down to a few meters of accuracy which is far more accurate than cell networks are currently able to do.

For application, the complete route may be generated for use in act 11, such as by using the complete route to form the visitation maps by location and/or activity used to input to the machine-learned network to build the graph. The complete route may be used to establish whether and when a business was visited.

The similarity graph and the routes are used to determine visitation to a location based on content on a viewable surface. The viewable surface is a display surface for content, such as the device itself for mobile content or a sign or surface for a poster, billboard, or other presentation. The content on the viewable surface is for a given business or other location or locations (e.g., coffeeshop A), such as indicating an available drink from the coffeeshop A. The location of coffeeshop A is linked to the viewable surface, which has a location.

In act 14, the artificial intelligence processor or other processor models a causal effect of viewable or audio content to visits of a location or locations. The graph generated by the machine-learned fingerprint network 52 is used to determine change in behavior due to viewing content, such as content transmitted to a mobile device, content on a billboard, or content in a poster. The causal effect may be in the form of a time and/or location for more effective placement of content. The effect of the content on change in behavior to cause visitation to a location is estimated. This estimation may be used to plan for a next campaign or display of content.

A machine-learned network is used to make a recommendation for placement of content. The network is trained to receive input of the graph with or without other input, such as visitation maps for devices and/or locations, activity maps, routes (e.g., trace data), metadata, campaign data (e.g., limitations on content placement such as not by a gas station), and/or other information. The network is trained to output one or more characteristics of a campaign or content placement, such as time, density, location, type (e.g., poster, billboard, and/or transmission to mobile device), or other information. Alternatively or additionally, the network is trained to output characteristics of devices or users of devices having a greatest impact on visitation based on content.

The training data is formed from various campaigns, such as various examples of placement of content and corresponding campaign data (e.g., restrictions on placement). The relationship of visitation by behavior cohort or device to content for each example placement is used to train, by machine learning, the network to recommend. Any machine learning and corresponding network may be used, such as a neural network with intention modeling.

In one embodiment, the recommendation system (e.g., machine-learned network to predict location and period for content) is trained over campaign data, which is produced by observing which devices are exposed to the content, and then tracking which members show up at the storefront, purchase at the location, dwell time at the location, and/or visit the location. The model then forms a hypothesis about who the content will work for and the factors that are causing the content to result in visits or purchase. Candidate devices that share these criteria or are in a behavior cohort for the criteria may be identified. A specific time and place to deliver the message is selected based on maximizing the visitation using the more complete routes and the behavior information. For training, the message (content) is treated as shown to a user via a variety of methods and the effect measured. The results are used to update the model's hypothesis about the effectiveness of the content across a diverse set of factors such as time, place, format, repetition, and fatigue.

The ability of content (e.g., out of home ads) to drive changes in consumer behaviors is considered to learn to output a recommendation for content. The recommendation is to motivate visits to a physical store or other location based on available content placement (e.g., time and location). To create training data relating content to visitation based on behavior, the problem is defined as an ensemble of causal models utilizing both a graphical counterfactual model and synthetic controls for the treated audience.

The ground truth relating behavior, metadata, and/or other information as causing visitation by content is created using the ensemble of casual models. A synthetic control that accounts for the spatial/temporal patterns of a subject is highly predictive of future behavior when modeling the associated behaviors of closely linked users, so is a strong model for establishing the effectiveness of content as a treatment.

Content placement is commonly used to target broad audiences to alter the behavioral patterns of the viewers of the content (i.e., to cause visitation or purchase). It is challenging to establish how effective content placement is in altering the patterns of those who are exposed to the message due to the enormous number of factors that make up a person's decision to visits a store, and the high difficulty in observing enough covariates to explain a change in the viewer's patterns of behavior.

With the ubiquitous use of mobile devices, it is possible to create an intricate and varied representation of human movement through the physical world measured down to meter-level precision. In cataloging this data, the environmental pressures that a person is exposed to over the course of many months may be understood and used to establish behavioral groups based on the social structures evident in the data, such as visitation data. These groups, when observed from the macro level, are predictive of future behavior of members of the community. The recommendation may be based on cohort (e.g., use input of behavior cohort or characteristics of a behavior cohort). Causal analysis is used for estimating the effectiveness of content placement by combining a massive data set of observations with purchase data, visit history, social, demographic, and/or psychographic data to build a picture of the human patterns that allows construction of an accurate baseline of behavior.

To determine causation, example training data is divided into sub-sets of devices exposed to and devices not exposed to content on a viewable surface. The exposure is during a period. Thus, data for a device for a period before content availability may be used to assign the device to the set not exposed, and data for that same device for a period during content availability may be used to assign that same device to the set of exposed.

The exposure is based on the trace data. The complete route output by the route network 54 or originally acquired sparse trace data indicate whether the device was at a same location as the content or a location from which content may be viewed. A visitation map may be generated where locations of content viewability are compared to the visitation map. Based on the route or visitation, a given device may or may not have been exposed to content during a period of content availability.

Each person or device is split into one of four groups including exposed and not exposed for both a pretreatment period and a treatment window or period. Treatment is whether the user of the device is exposed to the content. Whether or not the person visited the location or locations linked to the content (e.g., visited the coffeeshop) is aggregated over their check-in data, purchase data, and location traces. Any source, such as the metadata and/or route, may be used to determine visitation during the periods before, after, or during content availability. If any or a threshold number of sources indicate visitation, then the visitation based on aggregation is determined or assigned.

During the pre or non-treatment period, there is assumed to be no exposure occurring and thus users are placed into A and B groups for visited or not visited the location. These groupings facilitate discovery of the baseline characteristics of the consumer as well as to observe their propensity to be in the treatment area in the study period. During the treatment period, the users are placed into C and D groups that 'visited' or 'did not visit' the location.

Using the segmentation of act 12, the devices are assigned to behavior cohorts as well. For example, clustering is used to separate the devices into eight different cohorts. Each cohort is based on embedded information from the machine-learned network used in act 11 to form the graph. The graph may be used to create the cohorts, which represent different behavior characteristics of the members. These differences may be used to relate causal of visitation due to content exposure.

Each device is augmented with a continuous feature matrix V encoding times of visits, divided into 5-minute buckets of time. FIG. 3 shows examples for two devices D1 and D2. A visitation graph is formed by linking users who co-visit points of interest at similar times and in similar frequencies as the output in act 11. Each node represents a device, and each edge represents how similar the devices' visitation patterns are in terms of both frequency and time.

For determining the ground truth effect of content exposure to visitation to a location, causal modeling is used. Any modeling may be used. The modeling accurately establishes the causal effect of the content (e.g., OOH ads) on the observed visitation patterns of devices and corresponding users to one or more (e.g., a series) of points of interest. The quantity being measured is $E[Y^{T=1} - \hat{Y}^{T=0}]$, which is the estimated treatment effect. E is the estimated treatment effect for the counter factual, Y is outcome or expectation, and T is the treatment (T=0 is not treated and T=1 is treated). The expectation may be used to determine the content characteristics (e.g., placement and period) leading to visitation. Once the machine-learned network is trained, the network may be used to output the expectation or directly output the content characteristics to indicate which of a pool of content placements (e.g., locations, periods, and/or other characteristics) are likely to lead to more visits for the population in general and/or for the population with a given behavior characteristic or cohort.

In one embodiment, three models are used together, but additional, fewer, or different models may be used. The three models are based on counter factual reasoning, synthetic control, and probability of treatment. The models are used as a feedback loop for the recommendation neural network 56. The causal models provide the ground truth of if the predictions by the network during training are correct or not.

The machine-learned network is trained to model the causal effect of content on visitation based on a counter factual probability. The counter factual probability is used to determine visitation probability based on what would have happened sans treatment (i.e., without exposure to content). An equivalent audience match between pairs of untreated and treated devices is used. The distance between the pairs is minimized. The machine-learned network is trained with minimization of distances between pairs of the devices based on the similarities. Distance is computed using Jaccard distance for categorical data and Mahalanobis distance for continuous data. For persons x and y, where X, Y are the categorical components and $\vec{x}$, $\vec{y}$ are the continuous features, the distance is computed as $$\left(1 - \frac{|X \cap Y|}{|X \cup Y|}\right) + \sqrt{(\vec{x} - \vec{y})^T S^{-1} (\vec{x} - \vec{y})}.$$

X is the high dimensional feature vector indicating which demographic, psychographics, and attitudinal groups this person is a member of, while $\vec{x}$ is formed over the visitation and travel pattern history of this person.

Using the graph, the top (i.e., most similar) ten or other number of matches from the graph are randomly sampled for each device to build out controls for each treated user to perform 8-fold cross validation. Observing the difference in outcomes between the treated (i.e., exposed) and control (i.e., not-exposed) groups, the estimated treatment effect is determined. The less variance there is between the folds, the higher confidence in the result not being overly sensitive to the choice of control. The likelihood of visitation by the treated group without having seen the content is determined, indicating the causal effect of the content.

To avoid family or close friends over weighting the probability, the graph may be altered prior to random sampling. The similarity of direct neighbors (e.g., devices above a threshold similarity) in the graph is reduced, such as set to near or at zero. The reduction prevents or reduces the chances of sampling devices and corresponding persons who are likely friends to control for direct network effects.

In another causal model, the machine-learned recommendation network is trained to model the causal effect of content on visitation based on a synthetic control model. The recommendation machine-learned network is trained with a probability of visitation of the location based on the trace data from the devices and an embedding from the forming of the graph for before the period or periods of exposure to the content. The embedding in the form of the history of the businesses that this person visited is used with a cosine similarity between embedding vectors between pairs of devices as reflected in the graph. Devices are matched that have the most in common, and the difference in visitation rates between the treated devices and their matched controls is reported as the visitation lift. The synthetic control model considers the problem of predicting the probability of visitation by learning a representation from the spatial traces and visitation history of each device and corresponding user during the pre-treatment period. When it is challenging to disentangle who is exposed to the treatment, the synthetic control model provides a measure of causal effect.

The trained model is then used to make predictions about who will visit the store during the study period without exposure. This becomes the synthetic control audience. The difference in outcomes between the observed audience and the predicted audience during the period of exposure becomes the basis for estimated treatment effect. The difference reflects the causal effect of exposure to the content. In alternative embodiments, the machine-learned network is trained to model the difference as well or instead of the prediction of who will visit during the period of exposure.

In another causal effect model, the machine-learned network is trained to model the causal effect of content on visitation based on a propensity matching model. A probability of viewing is modeled. The probability of treatment is modeled by matching devices based on their propensity for treatment. This allows for the discovery of the features that are covariates of the treatment. The features are any characteristic, such as reflected in the trace data, metadata, and/or embedded features used in creating the graph. These propensity scores are used to match subjects with similar probabilities of being treated (i.e., viewing the content), and the effect of treatment is observed between the two groups, thus breaking the dependence of any confounding X values on the treatment probability.

Devices are matched by picking controls that minimize the statement $E(x)-E(y)|$ where $E(x)$ is the expected propensity score. For each treated device, closely matched control devices in the graph are randomly sampled to build out 8-fold cross validation sets. The mean difference in outcomes between the two populations is compared as the average treatment effect.

By modeling the problem, the causal effect of the treatment is estimated in general. The causal effect estimated by the different models may be combined, such as averaged or weighted sum, to indicate one value reflecting probability of visit caused by the content. Alternatively, the different outputs are used separately to reflect different characteristics of the effect of content characteristic on visitation. The output or outputs are used as ground truth so that the neural network is trained to recommend content characteristic based on behavior cohort, type of user of device, population of devices in a region, routes, visitation maps, campaign data (e.g., restrictions on location, cost, timing, etc.), and/or other information provided as input.

In act 15, the machine-learned network identifies factors leading to visitation due to content. The machine-learned network may have been trained to output variables having a greatest influence on causal effect. Using the results of one or more of the models, the information correlating to the results is identified. The information includes metadata, route, visitation pattern, or other information about the devices. The covariates of the graph or embedding in the graph are identified. The graph may be used to select devices, and the information for the selected devices is correlated with the causal effect. The covariates may be used by assigning a weight, such as a probability of contribution to the causal effect. The weighted covariates may be used to predict the effectiveness of content placement on behavior cohort or users of devices.

Figure 7:
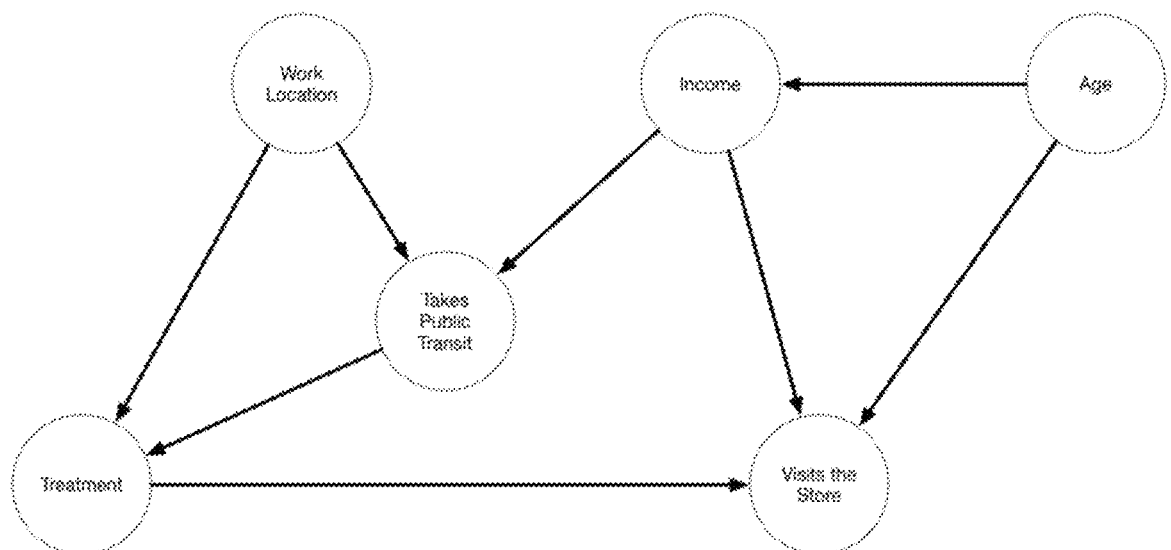
FIG. 7 is an example causational graph.

The output of one, two, or all three models is used to disentangle confounding variables, and thus accurately describe the causal relationships between content exposure and outcome (e.g., visitation or purchase). A causal graph may be formed. FIG. 7 shows an example causal graph relating the treatment (exposure to content) to visits to a business and the variables having a greatest influence on the content causing visitation. By modeling the problem, the causal effect of the treatment is estimated in general. The treatment being the cause of the observed behavior is determined. The causal graph building may be performed as a machine learning task. The network is trained by a machine to output a causal graph based on the observed data (any input information).

The effect of repeat exposures and/or the attention decay phenomenon may be modeled or determined from the causal effect models. The network may be trained to output recommendations based on the effect or repeat exposure and/or attention decay.

In act 16, the artificial intelligence or other processor causes display of a prediction of effectiveness on a display screen or device. The display may be on a report, such as by a printer or into memory. The causal effect estimated by or in the machine-learned prediction network is used to generate a display. A recommended location, period, and/or another characteristic is displayed. A list of recommended content placements, in ranked order of estimated effectiveness, may be displayed.

The displayed prediction may be relative, such as an output of content characteristic from the machine-learned network. The prediction is of a suggested most or sufficiently effective content location, period, and/or other characteristic selected from a pool of availability. The content recommendations (e.g., timing/period and location) are displayed. The learned causal effect is used to select the content characteristic. Alternatively or additionally, the prediction is a probability or other measure of the effect, such as an expected increase in visitation. The prediction may be the causal graph, such as displaying the covariates and the corresponding effectiveness of each. The graph shows the causal relationships (e.g., variables) relating to effectiveness of the recommendation for the content to be placed.

In yet other embodiments, the output or outputs of the machine-learned prediction network are used to map to content characteristics. For example, the causal graph identifies variables resulting in increased visitation, so the routes and metadata are used to identify any concentrations of devices over time most likely to be influenced by content. The location and/or period of content presentation is determined based on the concentrations.

Figure 6:
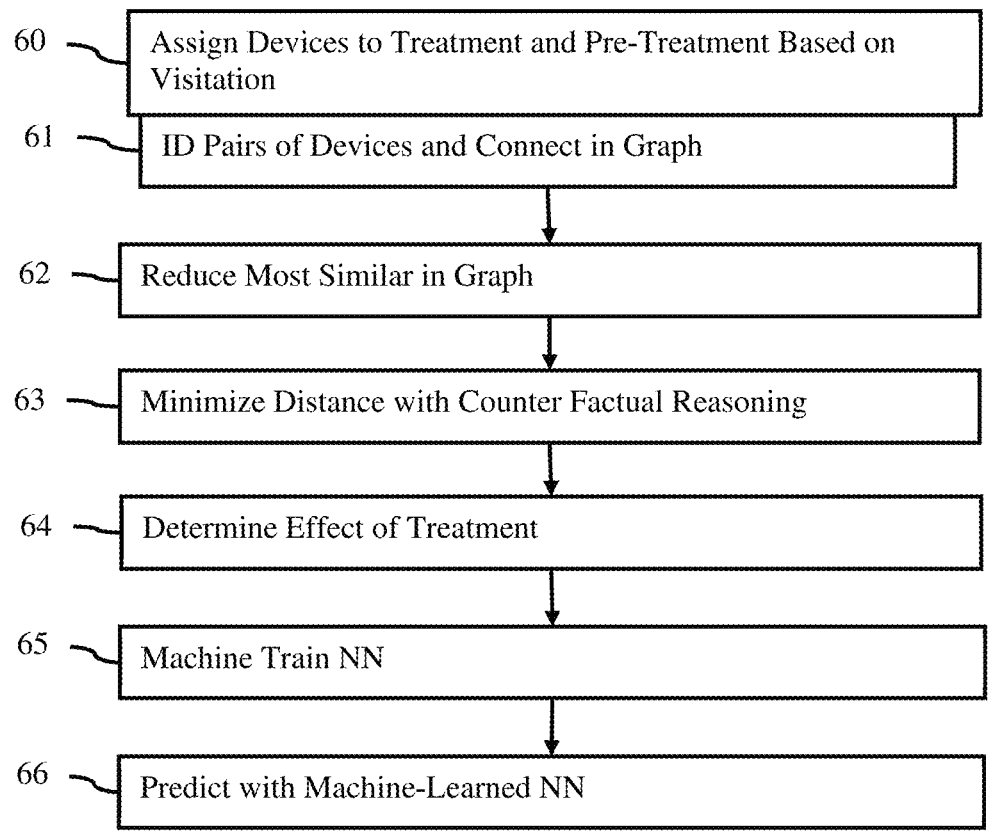
FIG. 6 is a flow chart diagram of one embodiment of a method for machine training of prediction of visitation.

FIG. 6 shows a method for training of prediction of visitation due to content. The prediction may be a recommended content location or period that results in maximum or a level of increased visitation. The machine trains a network to make a recommended placement better than other possible placements as measured by the ability to cause visitation.

The training uses one or more measures of causal effect of the content on visitation. In the example used below in FIG. 6, the counter factual reasoning model is used to measure the causal effect for training the network to make a recommendation.

Additional, different, or fewer acts may be provided, such as not performing acts 61 and/or 66. The acts are performed in the order shown (top to bottom) or other orders.

In act 60, the machine assigns devices for a pre-treatment period as having visited or not visited a location and assign the devices for a treatment period as having visited or not visited the first location. Many different groups of devices and corresponding locations may be used, such as associated with different content placements that have occurred in the past. Metadata and/or routes, such as routes estimated by a machine-learned network based on sparse trace data, are used to establish visitation.

In act 61, the machine generates a graph. Pairs of devices are identified by sequencing through a table or random selection. Pairs of devices are identified based on times and/or frequencies of visitations to the location or locations. Location specific visitation maps may be used to determine a similarity between each pair, and the similarity being above a threshold is used to identify a matching pair.

The pairs are connected to form a graph. The edges connecting each unique pair is weighted by the similarity. The similarity is calculated from the data or output by a machine-learned neural network based on input of the visitation maps and/or metadata.

In act 62, the machine reduces the similarities for the most similar pairs. To reduce the influence of friends and families, the edge weights for the most similar pairs are reduced. Where a subset of the graph is to be used, such as random sampling of pairs with similarities above a threshold, the reduction in similarities for the closest pairs results in them not being or less likely to be selected.

In act 63, the machine minimizes a distance based on the similarities. The most similar pairs are selected, such as by random selection or selection of all. The pairs assigned to the pre-treatment form one group. The pairs from the period of treatment form another group. Counterfactual reasoning is applied to minimizing for greatest similarity in the graph. The minimization is a function of behavioral metadata for the pairs and visitation and travel pattern histories of the pairs.

Using cross validation (e.g., 8-fold), a control group is used to estimate visitation from the untreated group. A difference between treated and the estimate for the non-treated groups is found. This difference reflects the effect of the content determined in act 64.

The effect from the counter factual reasoning and/or other causal effect models is used as a ground truth or to determine the ground truth. For the various samples of content relative to devices, the effects are measured. These effects show the effectiveness of the past content on driving visitation. The characteristics of the content may be correlated to the effects. The ground truth may be the characteristics of the content that cause more visits, based on the measurement of effectiveness.

In act 65, the machine trains the neural network. The network is trained to receive inputs (e.g., routes, visitation maps, graph of device pairs, metadata, campaign data, and/or other information) and generate an output (e.g., a recommendation for content characteristics or effect that may be used to relate to a recommendation). Using many samples, the neural network is trained. Convolution kernels, weights, connections, or other characteristics of the network are iteratively determined based on L2 or other errors between the ground truth and network prediction as currently trained.

In act 66, the machine or a different processor predicts the effect of visitation patterns of the devices based on the effect of the treatment. The trained network is used to output a recommendation based on the knowledge from the effect of treatment by the content. The recommendation is for content presentation more likely to cause greater visitation.

FIG. 8 shows a system 80 for recommending content placement based on movements and locations provided by trace data and based on metadata. The system 80 implements the method of FIG. 1, the method of FIG. 6, or another method. The system 80 is for application of one or more machine-learned networks, such as the three machine-learned neural networks 52, 54, 56 of FIG. 5. Given input trace data and metadata, the system 80 uses the networks 52, 54, 56 to recommend content placement.

While the system 80 is described below in the context of application of the previously learned network or networks, the system 80 may be used to machine train one or more of the neural networks.

The system 80 includes a pattern processor 82, a memory 83, a display 84, and a database 81. The pattern processor 82, memory 83, and display 84 are shown separate from the database 81, such as being part of a workstation, computer, or server. In alternative embodiments, the pattern processor 82, memory 83, and/or display 84 are part of the database 81. In yet other embodiments, the system 80 does not include the database 81. Additional, different, or fewer components may be used.

The database 81 is a memory, such as a buffer, cache, RAM, removable media, hard drive, magnetic, optical, database, or other now known or later developed memory device. The database 81 is a single device or group of two or more devices. The database 81 is associated with or part of the pattern processor 82 but may be outside or remote from other components of the system 80.

The database 81 is configured by a processor to store data. Any of the data discussed above for FIG. 1 may be stored. For example, trace data, content inventory, maps, graphs, behavior cohorts, assignments, behavior information, identifications, links, probabilities, and/or recommendations are stored. Rather than storage in a given database, different databases may be accessed as information is needed.

The memory 83 is a buffer, cache, RAM, removable media, hard drive, magnetic, optical, database, or other now known or later developed memory device. The memory 83 is a single device or group of two or more devices. The memory 83 is associated with or part of the pattern processor 82 but may be outside or remote from other components of the system 80.

The memory 83 stores the machine-learned networks 52, 54, 56. For example, one machine-learned network 52 for generation similarity or a graph, another network 54 for determining routes (i.e., estimating unobserved parts of routes from the sparse trace data), and another network 56 for recommending content placement are stored. Additional, different, or fewer machine-learned networks may be stored.

The memory 83 is a non-transitory computer readable storage medium with processing instructions. The networks 52, 54, 56 include weights, filter kernels, node connections, and/or other information defining the trained networks, which configure the pattern processor 82 as instructions for generating outputs based on inputs. The memory 83 stores data representing instructions executable by the programmed pattern processor 82. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The pattern processor 82 is a general processor, digital signal processor, three-dimensional data processor, graphics processing unit (GPU), bank of GPUS, application specific integrated circuit, field programmable gate array, digital circuit, analog circuit, quantum computer, artificial intelligence processor, combinations thereof, or other now known or later developed device for recommending content placement. The pattern processor 82 is a single device, a plurality of devices, or a network. For more than one device, parallel or sequential division of processing may be used. Different devices making up the pattern processor 82 may perform different functions. The pattern processor 82 is a hardware device or devices configured by or operating pursuant to stored instructions, design (e.g., application specific integrated circuit), firmware, or hardware to perform various acts described herein.

The display 84 is a CRT, LCD, plasma, projector, printer, or other output device for showing an image or other output of the pattern processor 82 and/or database 81. The display 84 displays the recommendation, estimated visitation, causal graph, and/or other information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed:

1. A method for machine-based prediction of visitation, the method comprising:
   obtaining first trace data including previously traversed routes for multiple devices, the first trace data having missing data for unobserved portions of the previously traversed routes, each of the previously traversed routes that includes an unobserved portion including at least an observed portion within the first trace data;
   generating, by a first machine-learned network trained using deep learning, second trace data that fills in at least some of the missing data for the unobserved portions of the previously traversed routes, the second trace data indicating that first content was perceptible from at least one of the unobserved portions of the previously traversed routes;
   after generating the second trace data and using the second trace data as an input, determining exposure to the first content;
   modeling, by a second machine-learned network and based on the determination of exposure to the first content, a causal effect of the first content to visits of a location; and
   displaying a prediction of effectiveness of second content based on the causal effect.

2. The method of claim 1, where the unobserved portions include portions of the previously traversed routes for which a global positioning system signal was obstructed.

3. The method of claim 1, where the deep learning includes training based on routes previously recorded for devices identified as similar to individual ones of the multiple devices.

4. The method of claim 1, where the second trace data includes a longitude, latitude, timestamp, and/or an advertising identifier.

5. The method of claim 1, where the second trace data indicates that the first content was perceptible from at least one of the unobserved portions of the previously traversed routes by indicating that the first content was viewable from at least one of the unobserved portions of the previously traversed routes.

6. The method of claim 1, where the second trace data indicates that the first content was perceptible from at least one of the unobserved portions of the previously traversed routes by indicating that at least one of the unobserved portions of the previously traversed routes crossed predetermined locations associated with exposure to the first content.

7. The method of claim 1, where modeling the causal effect of the first content to the visits of the location includes determining a portion of the multiple devices that visited the location.

8. The method of claim 7, where determining the portion of the multiple devices that visited the location includes determining a dwell time at the location for at least some of the multiple devices.

9. The method of claim 1, where modeling the causal effect of the first content to the visits of the location includes executing a propensity matching model.

10. The method of claim 1, where modeling the causal effect of the first content to the visits of the location includes determining a variable weight indicative of a probability of contribution to the causal effect.

11. A system including:
    network interface circuitry configured to:
       obtain first trace data including previously traversed routes for multiple devices, the first trace data having missing data for unobserved portions of the previously traversed routes; and
    processing circuitry configured to:
       generate, by a first machine-learned network trained using deep learning, second trace data that fills in at least some of the missing data for the unobserved portions of the previously traversed routes, the second trace data indicating that first content was perceptible from at least one of the unobserved portions of the previously traversed routes, each of the previously traversed routes that includes an unobserved portion including at least an observed portion within the first trace data;
       after generating the second trace data and using the second trace data as an input, determine exposure to the first content;
       model, by a second machine-learned network and based on the determination of exposure to the first content, a causal effect of the first content to visits of a location; and
       display a prediction of effectiveness of second content based on the causal effect.

12. The system of claim 11, where the unobserved portions include portions of the previously traversed routes for which a global positioning system signal was obstructed.

13. The system of claim 11, where the second trace data includes a longitude, latitude, timestamp, and/or an advertising identifier.

14. The system of claim 11, where the second trace data indicates that the first content was perceptible from at least some of the previously traversed routes by indicating that the first content was viewable from at least some of the previously traversed routes.

15. The system of claim 11, where the second trace data indicates that the first content was perceptible from at least some of the previously traversed routes by indicating that at least some of the previously traversed routes crossed predetermined locations associated with exposure to the first content.

16. Non-transitory machine-readable media configured to store instructions, the instructions, configured to, when executed, cause a processor to:
- obtain first trace data including previously traversed routes for multiple devices, the first trace data having missing data for unobserved portions of the previously traversed routes;
- generate, by a first machine-learned network trained using deep learning, second trace data that fills in at least some of the missing data for the unobserved portions of the previously traversed routes, the second trace data indicating that first content was perceptible from at least one of the unobserved portions of the previously traversed routes, each of the previously traversed routes that includes an unobserved portion including at least an observed portion within the first trace data;
- after generating the second trace data and using the second trace data as an input, determine exposure to the first content;
- model, by a second machine-learned network and based on the determination of exposure to the first content, a causal effect of the first content to visits of a location; and
- display a prediction of effectiveness of second content based on the causal effect.

17. The non-transitory machine-readable media of claim 16, where the instructions are configured to cause the processor to model the causal effect of the first content to the visits of the location by determining a portion of the multiple devices that visited the location.

18. The non-transitory machine-readable media of claim 17, where the instructions are configured to cause the processor to determine the portion of the multiple devices that visited the location by determining a dwell time at the location for at least some of the multiple devices.

19. The non-transitory machine-readable media of claim 16, where the instructions are configured to cause the processor to model the causal effect of the first content to the visits of the location by executing a propensity matching model.

20. The non-transitory machine-readable media of claim 16, where the instructions are configured to cause the processor to model the causal effect of the first content to the visits of the location by determining a variable weight indicative of a probability of contribution to the causal effect.

* * * * *